United States Patent [19]
Shinoda et al.

[11] Patent Number: 5,247,013
[45] Date of Patent: Sep. 21, 1993

[54] BIOCOMPATIBLE POLYESTER AND PRODUCTION THEREOF

[75] Inventors: Hosei Shinoda; Masami Ohtaguro; Shigeru Iimuro, all of Aichi, Japan

[73] Assignee: Mitsui Toatsu Chemicals, Inc., Tokyo, Japan

[21] Appl. No.: 902,794

[22] Filed: Jun. 26, 1992

Related U.S. Application Data

[63] Continuation of Ser. No. 582,192, Sep. 25, 1990, abandoned.

[30] Foreign Application Priority Data

Jan. 27, 1989 [JP] Japan .................................. 1-16248

[51] Int. Cl.$^5$ ..................... C08G 63/06; C08G 63/664
[52] U.S. Cl. .................................. 525/54.2; 527/300; 527/305; 524/732
[58] Field of Search ............... 525/54.2; 527/300, 305; 524/732

[56] References Cited

U.S. PATENT DOCUMENTS

| | | | |
|---|---|---|---|
| 4,057,537 | 11/1977 | Sinclair | 528/357 |
| 4,767,628 | 8/1988 | Hutchinson | 424/426 |
| 4,960,814 | 10/1990 | Wu et al. | 524/311 |

FOREIGN PATENT DOCUMENTS

| | | |
|---|---|---|
| 2551072 | 3/1985 | France . |
| 62-64824 | 3/1987 | Japan . |
| 62-31736 | 7/1987 | Japan . |
| 63-17929 | 1/1988 | Japan . |
| 1604177 | 12/1981 | United Kingdom . |
| 2158081 | 11/1985 | United Kingdom . |

*Primary Examiner*—Nathan M. Nutter
*Attorney, Agent, or Firm*—Burns, Doane, Swecker & Mathis

[57] ABSTRACT

A biocompatible polyester which has improved hydrolyzability obtained by bonding saccharide to the structure of a polymer consisting of a glycolic acid unit and/or a lactic acid unit, and a process for Preparing the biocompatible polyester are disclosed.

12 Claims, 2 Drawing Sheets

BIOCOMPATIBLE POLYESTER AND PRODUCTION THEREOF

This application is a continuation of application Ser. No. 07/582,192, filed Sep. 25, 1990 and now abandoned.

BACKGROUND OF THE INVENTION

1. Field of the Invention

The present invention relates to a biocompatible polyester for use in medical devices such as surgical sutures, matrices of sustained release preparations and an internal split-plate in fracture cores, and a process for preparation of the biocompatible polyester.

More particularly, the invention relates to a biocompatible polyester which has improved hydrolyzability and contains an introduced saccharide bond to a polymer chain of the biocompatible polyester having recurring structural units consisting of a glycolic acid unit and/or a lactic acid unit.

2. Description of the Related Art

Biocompatible polyester of the present invention has recurring structural units consisting of a glycolic acid unit and/or a lactic acid unit, and is a polymer having the recurring structural units represented by the formula (I):

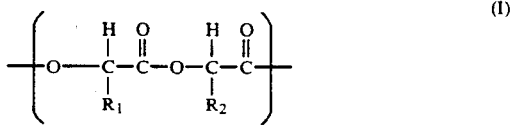

wherein $R_1$ and $R_2$ are a hydrogen atom or a methyl group, and may be the same or different.

The biocompatible polyester having the above recurring structural units is generally divided, in the above formula (I), into a glycolic-acid based polymer wherein a 80 to 100% portion of $R_1$ and $R_2$ is a hydrogen atom and a 0 to 20% portion is a methyl group, and a lactic-acid based polymer wherein a 0 to 80% portion of $R_1$ and $R_2$ is a hydrogen atom and a 20 to 100% portion is a methyl group.

Any of the above biocompatible polyester is nonenzymatically hydrolyzed in vivo into glycolic acid and lactic acid. These acids are finally converted to carbon dioxide and water through a metabolic pathway and are excreted from the organism. Hence, the above polyester is an interesting bioabsorbable material.

However, the glycolic-acid based polymer (hereinafter abbreviated as PGA) generally has poor solubility in various solvents, a high melting point of 180° to 240° C. and difficulty in molding. According to these properties, high molecular weight PGA is processed into fibers and used for sterile materials for surgery such as sutures and gauze.

Practically, surgical sutures prepared from the glycolic acid based polymer have already been marketed from ACC Co. Ltd. and Ethicon Co. Ltd. under the trade marks of Dexon (100% by mole of glycolic acid structure) and Vicryl (from 85 to 90% by mole of glycolic acid structure and from 10 to 15% by mole of lactic acid structure), respectively.

The glycolic-acid based polymer requires a long period, e.g. about a month until the polymer loses most of its initial strength by hydrolysis in vivo.

Consequently, it is desired to develop materials which can be hydrolyzed and absorbed within a much shorter period depending upon the portion and method of suturing.

On the other hand, the lactic-acid based polymer is usually divided into the following classes according to the proportion of lactic acid structure and glycolic acid structure.

That is, the classes are polylactic acid (hereinafter abbreviated as PLA) wherein a 100% portion of $R_1$ and $R_2$ in the formula (I) is a methyl group, and a lactic acid-glycolic acid copolymer (hereinafter abbreviated as PGLA) wherein a 0 to 80% portion of $R_1$ and $R_2$ is a hydrogen atom and a 20 to 100% portion of $R_1$ and $R_2$ is a methyl group excluding the situation where a 100% portion of $R_1$ and $R_2$ is a methyl group.

PLA can provide a high-strength polymer. A high molecular eight PLA, in particular, is processed into bars and plates and used for bioabsorbable plates of internal splints for fracture care.

On the other hand, PGLA is somewhat inferior in strength as a polymer and hence is used primarily for the matrix of sustained release preparations.

As mentioned above, the lactic-acid based polymer is excellent in processability and solubility in various solvents. Thus the polymer is processed into pellets, needles, films and microspheres, and is widely used for the matrix of sustained release preparations which are applied to internal imbedding and intravenous injection.

The bioabsorbable plates of internal splints for fracture care prepared from PLA requires from 6 to 12 months for hydrolysis in vivo. With the recent progress of medicine, it has been desired to develop materials which can be hydrolyzed within a much shorter period.

As to the PGLA matrix for sustained release preparations, it is also required to develop matrix materials which can be hydrolyzed within a much shorter period such as several days depending upon the kind and administration of drugs to be released.

As mentioned above, the biocompatible polyester is different in the object and mode of use depending upon its kind. However, a common subject for any kind of the biocompatible polyester is to develop materials having a higher hydrolyzability in vivo or materials controlled so as to obtain a desired level of hydrolyzability.

Thus, the development of such biocompatible polyester is now strongly demanded.

Accordingly, the following processes have been proposed for the preparation of glycolic-acid based polymer.

(1) Japanese Patent Publication SHO 62-31736(1987) discloses a preparation process for polyglycolic acid comprising polymerizing glycolide at a temperature of 160° to 180° C. in the presence of stannous octoate in an amount of 0.01 to 0.05% by weight per weight of glycolide and a monohydric alcohol having a saturated aliphatic straight chain containing even numbers of 12 to 18 carbon atoms in an amount of 0.5 to 2.8 times by weight per weight of stannous octoate.

(2) Japanese Patent Laid-Open Publication SHO 63-17929(1988) discloses a preparation process for polyglycolic acid having an inherent viscosity of 0.85 to 1.1 dl/g comprising polymerizing glycolide at a temperature of 220° to 250° C. in the presence of stannous octoate in an amount of 0.001 to 0.005% by weight per weight of glycolide and a monohydric alcohol having an aliphatic straight chain containing 10 to 18 carbon atoms in an amount of 0.11 to 0.22% by mole per mole of glycolide.

On the other hand, the following processes have also been proposed on the preparation of lactic-acid based polymers. For example, Japanese Patent Laid-Open Publication SHO 62-64824(1987) discloses a low molecular weight heterogeneous lactic-acid/glycolic-acid copolymer containing from 25 to 100% by mole of lactic acid structure and from 0 to 75% by mole of glycolic acid structure and having an inherent viscosity of 4 dl/g or less in a 1 g/100 ml solution of chloroform or dioxane; and a preparation process for the copolymer. An example of the above-mentioned Japanese Patent Laid-Open Publication SHO 62-64824(1987) describes a process for conducting polymerization of lactide with glycolide at 160° C. by using 0.2% by weight of stannous octoate as a catalyst in the presence of dl-lactic acid hydrate to obtain the desired copolymer.

As to the preparation method for the biocompatible polyester, methods for catalytically conducting ring-opening polymerization of glycolide or lactide which are respectively dehydrated cyclic dimers of glycolic acid and lactic acid have been disclosed as described above. A process for carrying out the polymerization in the co-existence of alcohols such as lauryl alcohol or hydroxy-acids such as glycolic acid as a promoter (chain extender) has been proposed as the most general process.

However, any of the known preparation processes above have never disclosed a technique for enhancing hydrolyzability in vivo Or a technique for preparing biocompatible polyester having desired hydrolyzability.

The means for merely controlling, accelerating in particular, the hydrolysis rate of the biocompatible polyester has been principally to increase the amount of the promoter for use in the polymerization. That is, it has been found that increase in the amount of the promoter decreases molecular weight of the polyester formed and hence increases the hydrolysis. This leads to a lower molecular weight and the accompanied problem of lowering physical properties. Thus this technique has not been a favorable process for wide use.

OBJECTS AND SUMMARY OF THE INVENTION

The object of the present invention is to improve the hydrolyzability in vivo of a biocompatible polyester and to provide a biocompatible polyester having desired hydrolyzability which is suitable for various administrations in vivo and a preparation process for biocompatible polyesters.

As a result of an intensive investigation in order to achieve the above objects, the present inventors have found that, in the preparation for a biocompatible polyester having recurring structural units consisting essentially of a glycolic acid unit and/or a lactic acid unit by the polymerization of glycolide or lactide, the polyester obtained by carrying out the polymerization in the presence of a saccharide has further improved hydrolyzability. Thus the present invention has been completed.

One aspect of the invention is a biocompatible polyester having improved hydrolyzability obtained by bonding a saccharide to the molecular structure of a polymer having recurring structural units consisting essentially of a glycolic acid unit and/or a lactic acid unit represented by the formula (I):

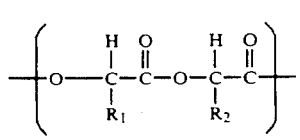

wherein $R_1$ and $R_2$ are a hydrogen atom or a methyl group and may be the same or different.

Another aspect of the invention is a process for preparing the biocompatible polyester by the polymerization of glycolide and/or lactide in the presence of the saccharide.

DESCRIPTION OF THE PREFERRED EMBODIMENTS

Figure 1:
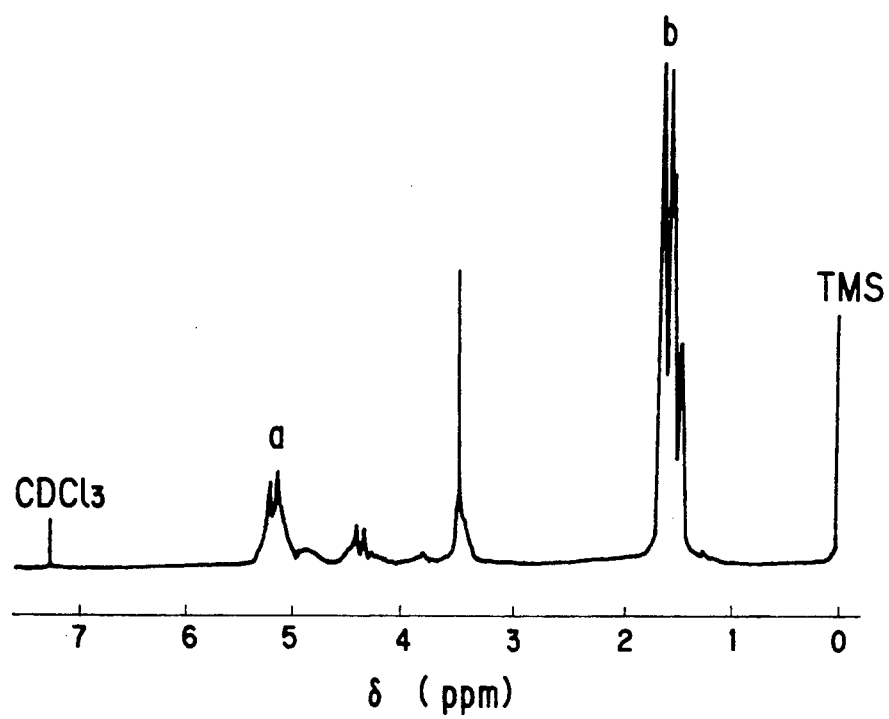
FIG. 1 illustrates a H-NMR spectrum of the biocompatible polyester obtained in example 1.

The biocompatible polyester of the present invention can be prepared by the following process.

In the first step glycolide and/or lactide are used as raw materials for the polymer having recurring structural units of the formula (I) above. Glycolide and lactide are cyclic dimers readily prepared by dehydrating poly-condensation and successive heat-decomposition of glycolic acid and lactic acid, respectively. There are four isomers of lactide, that is, D-lactide which is the cyclic dimer of D-lactic acid, L-lactide which is the cyclic dimer of L-lactic acid, meso-lactide which is the cyclic dimer of D-lactic acid and L-lactic acid, and DL-lactide which is the racemic mixture of D-lactide and L-lactide. Any type of lactide can be used as the raw material of the invention.

Other lactones can also be used in the polymerization in combination with glycolide and/or lactide which are used as monomers. Exemplary lactones include β-propiolactone, β-butyrolactone, δ-valerolatone and a εcaprolactone.

The amount of glycolide and/or lactide can be varied depending upon the object of administration of the biocompatible polyester obtained. For example, n the case of the glycolic acid unit where both $R_1$ and $R_2$ in the formula (I) are hydrogen atoms and in the case of the lactic acid unit where both $R_1$ and $R_2$ are methyl groups, glycolide or lactide is used alone, respectively. In the polymers containing the glycolic acid unit and the lactic acid unit where $R_1$ and $R_2$ in the formula (I) are a hydrogen atom and a methyl group, respectively, the amount of glycolide and lactide can be determined depending upon the properties required for the biocompatible polyester obtained.

As mentioned above, the known biocompatible polyester having recurring structural units represented by the formula (I) is divided into a glycolic-acid based polymer wherein a 80 to 100% portion of $R_1$ and $R_2$ is a hydrogen atom and a 0 to 20% portion is a methyl group, and a lactic-acid based polymer wherein a 0 to 80% portion of $R_1$ and $R_2$ is a hydrogen atom and a 20 to 100% portion is a methyl group.

The glycolic-acid based polymer of high molecular weight is processed into fibers and used for sterile surgical materials such as sutures and gauze. The lactic-acid/glycolic-acid copolymer and the lactic acid homopolymer are excellent in processability and solubility in solvents, and hence can be processed into pellets, needles, films and microspheres and used for the matrix of sustained release preparations which are applied to internal imbedding and intravenous injection. The lactic acid homopolymer of high molecular weight, in particular, is processed into bars or plates, and is used for the biocompatible plates of internal splits in fracture care.

Consequently, the amount of glycolide and lactide can be determined by considering these objects of administration.

The saccharide which is used for bonding to the molecular structure of the polymer is generally low toxic to organisms and is very suitable as the raw material used for the design of medical polymer materials such as biocompatible polyester.

The saccharide which is used in the process of the invention is a single compound or a mixture of compounds selected from the group consisting of monosaccharide, oligosaccharide, polysaccharide and glucoside. Exemplary saccharides include monosaccharides such as glucose, mannose, allose, arthrose, talose, galactose arabinose, ribose, xylose, erythrose, fructose, ribulose, and glycerose; oligosaccharides such as sucrose, cellobiose, trehalose, dextrin, cyclodextrin and raffinose; polysaccharides such as amylose, dextran, starch, pullulan, cellulose and galactan ; deoxysaccharides such as deoxyribose, aminosaccharides such as glucosamine ; thiosaccharides such as thioglucose ; branched saccharides such as streptose ; acid saccharides such as uronic acid ; polyuronic acids ; phosphate polysaccharides ; mucopolysaccharides ; heteropolysaccharides ; and glucosides such as methylglucoside (1-o-methyl-D-glucose), digitalis nucleotide and nucleoside.

The effect of the invention can be obtained by using the above saccharide. The saccharide can be selected for use in consideration of the desired effect. For example, preferred saccharides for use are glucosides, methylglucoside in particular. The saccharide may be used singly or in combination.

The amount of the saccharide can be suitably determined by considering the desired properties of biocompatible polyester such as desired level of hydrolylability and strength of molded articles.

For example, in the case of preparing sutures and internal splint plates which generally required strength of the biocompatible polyester, the saccharide is used in an amount as a hydroxyl group concentration of usually from 0.001 to 1% by mole, preferably from 0.01 to 0.1% by mole per mole of glycolide and/or lactide. When the amount is less than 0.00% by mole, improvement of hydrolyzability which is the effect of the invention is insufficient. On the other hand, an amount exceeding 1% by mole is, though effective for improving the hydrolyzability, liable to cause greater loss in strength of the polymer as compared with the effect, which result is unfavorable for certain applications.

When the biocompatible polyester is used for applications where strength is not required, for example, the matrix of sustained release preparations, the saccharide can be used in a considerably large amount, that is, to an amount as a hydroxyl group concentration of about 100% by mole per mole of glycolide and/or lactide.

Polymerization reaction can be carried out by solution polymerization using organic solvents such as chloroform and dichloroethane. However it is usually preferred to carry out the reaction by bulk polymerization in a molten state.

The reaction can be conducted in the presence or absence of a catalyst. However, it is preferable to use the catalyst in order to obtain a high molecular weight polymer within a short time.

The polymerization catalyst which can be used includes known catalysts such as an anionic catalyst, cationic catalyst, coordination catalyst and other compounds exhibiting catalytic action in the polymerization reaction of the invention. Examples of the catalyst are compounds primarily containing a polyvalent metal such as zinc chloride, titanium tetrachloride, iron chloride, boron trifluoride ether complex, aluminum chloride, antimony trifluoride and lead oxide. Tin compounds and zinc compounds are preferably used. Stannous octoate is particularly preferred in the tin compounds.

The amount of the catalyst is suitably determined depending upon the catalyst kind and polymerization temperature and is preferably in the range of 0.001 to 0.1% by weight per weight of the monomer, i.e., glycolide and/or lactide.

The polymerization temperature in bulk polymerization may be at least melting point of the raw material monomer, i.e. glycolide and lactide (glycolide: about 85° C., L-lactide or D-lactide: about 95° C., DL-lactide: about 120° C., meso-lactide: about 45° C.). Solution polymerization using solvents such as chloroform and dichloroethane can be carried out even at a temperature lower than the above melting point.

The biocompatible polyester of the invention obtained by the above preparation process consists essentially of a structure wherein a saccharide skeleton is bonded to the molecular structure of the polymer having recurring structural units represented by the above formula (I). Hence, the biocompatible polyester of the invention has a structure different from that of the biocompatible polyesters obtained by conventional methods.

The fact can be proved by the examples described below.

That is, the polyester in Example 1 (referred to as PLA-2) which is a biocompatible polyester of the invention and is obtained by polymerizing lactide in the presence of the saccharide, and the lactide polymer in comparative Example 1 (referred to as PLA-1) which is obtained by the conventional process in the absence of the saccharide were dissolved in chloroform, respectively. H-NMR spectra were measured on each solution obtained. According to the results, the spectrum of PLA-1 illustrated in FIG. 2 simply and definitely exhibits at 1.55 ppm and 6.16 ppm a doublet(b) which is assigned to methyl hydrogen in polylactic acid:

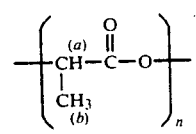

and a quartet (a) which is assigned to methylene hydrogen in polylactic acid, respectively. On the other hand, the spectrum of PLA-2 illustrated in FIG. 1 reveals peaks which are assigned to the saccharide in the range of 3.3 to 4.8 ppm in addition to the above multiplets.

Both PLA-1 and PLA-2 were dissolved in chloroform on measuring H-NMR (Nuclear Magnetic Resonance) spectra. Saccharide is hydrophilic and hence is not soluble in chloroform even though unreacted saccharide remained in PLA-2. Consequently, it is evident that the peaks found on the spectrum of PLA-2 resulted from the bonding of the polyester chain to hydroxyl groups of the saccharide in the course of polymerization.

Additionally, the difference in polymer structure is shown by the fact that the properties and behavior of the biocompatible polyester of the invention is different from those of conventionally obtained biocompatible polyesters, for example, improvement in hydrolyzability, reduction in melt viscosity, improvement of solubility in solvent, and lowering or elimination of melting point in polyester.

The molecular weight of the polymer can be estimated by usual methods such as gel permeation chromatography(GPC) and measurement of solution viscosity.

Relational expression between solution viscosity and molecular weight has not yet been obtained on the biocompatible polyester of the invention. However, it can be assumed that higher is solution viscosity indicates higher molecular weight as in the case of usual biocompatible polyesters.

In the preparation of the biocompatible polyester of the invention, the molecular weight and primary structure of the polyester formed, that is, the composition ratio of polyester chain to saccharide skeleton, chain length of polyester, structure of saccharide skeleton and molecular weight of saccharide skeleton can be controlled by the kind and amount of saccharide co-existing in the system during polymerization.

For example, when the polymerization is carried out in the presence of a polysaccharide, the polymer formed has a structure wherein polyester chains are extended from a polysaccharide chain like a comb. An increase in the amount of the polysaccharide co-existing in the polymerization leads to a shorter length of the polyester chains bonded to the polysaccharide skeleton.

When the polymerization is carried out using a monosaccharide or an oligosaccharide having a relatively short chain, the polymer obtained has a structure wherein polyester chains are radially extended from a central saccharide skeleton.

Further, in the cases where the saccharide is a medicative glucoside, for example, streptomycin, the internally administered biocompatible polyester is gradually hydrolyzed to perform sustained release of preparations. Thus the biocompatible polyester acts as a useful raw material and can also be applied to a drug delivery system (DDS).

As mentioned above with respect to the hydrolyzability and other properties, the present invention provides various kinds of biocompatible polyesters having higher hydrolyzability and superior properties while maintaining the same level of molecular weight as compared with conventional biocompatible polyesters. Thus the present invention extends the field of application of biocompatible polyesters.

The present invention will be illustrated further in detail by way of examples. In the examples, properties were measured by the following methods.

Average Molecular Weight and Molecular Weight Distribution

Polymer was dissolved in chloroform in a concentration of 1%. When the polymer was insoluble in chloroform, it was dissolved in hexafluoroisopropanol (hereinafter abbreviated as HFIP). GPC was carried out by using chloroform or HFIP as a eluate, respectively.

Weight average molecular weight (Mw) and number average molecular weight (Mn) were obtained by conversion to polystyrene.

Molecular weight distribution of the polymer was estimated by the ratio Mw/Mn.

Hydrolyzability

When the polymer was soluble in chloroform, a 5% chloroform solution was prepared. The solution was cast on a horizontally placed flat-disk and dried at ambient temperature to obtain a film sample. When the polymer was insoluble in chloroform, the polymer was crushed into powder and used for the sample.

In a test tube, 250 mg of the sample was placed and 25 ml of a phosphoric-acid/citric-acid buffer solution having pH of 7.3 was added. The test tube was fixed in a thermostat at 37° C. After standing for a prescribed time, the mixture in the test tube was concentrated to dryness under reduced pressure. The residue was dissolved in chloroform or HFIP, and Mw was measured by GPC. Molecular weight retention (%) was calculated by the following formula.

Mw after prescribed time × 100 / initial Mw

Nuclear Magnetic Resonance (H-NMR) Spectrum

The sample was dissolved in deuterated chloroform or a 10/1 mixture of HFIP/deuterated chloroform in a concentration of 10% and filtered. The filtrate was charged in a 5 mm $\phi$ test tube and measured at 100 MHz with a H-NMR measuring equipment.

Infrared Absorption (IR) Spectrum

Spectrum was measured by KBr tablet method.

Melting Point

Melting point was measured by using a differential scanning calorimeter (DSC) at a temperature rise rate of 10° C./min.

Elemental Analysis

The sample was heat-decomposed at 850° C. and measured with an elemental analyzer equipped with a thermal conductivity detecter.

Melt Viscosity

Melt viscosity was measured with a KOKA-moldel flow tester at 235° C. by using a nozzle having a diameter of 1 mm and a length of 10 mm.

Solution Viscosity

Chloroform, HFIP or a 7/10 mixture of trichlorophenol/phenol was used as a solvent. A solution having a sample concentration of 0.5 g/dl was prepared. Measurement was made with a Ubberlohde viscometer at a temperature of 25° ± 0.05° C. (in the case of chloroform or HFIP) or 30°±0.05° C. (in the case of a trichlorophenol/phenol mixture).

Viscosity $\eta$ of the solution was calculated from the following equation.

$$\eta = \log_e (T_1/T_0)C$$

wherein

T$_0$ = reference measuring time
T$_1$ = measuring time of sample
C = concentration of solution (0.5)

EXAMPLE 1

In a glass polymerization tube, 5.0 g (0.035 mole) of L-lactide was charged, and 0.015 wt % of a stannous octoate catalyst in the form of toluene solution and 1.0 g (20.0 wt %) of methlyglucoside (1-o-methyl-D-glucose) were added.

The polymerization tube was dried for several hours under deaeration and sealed. Polymerization was carried out at 150° C. for 2 hours. After the reaction, 50 ml of methylene chloride was added to the reaction mixture and stirred. A clear solution was obtained, which result definitely proved that methylglucoside used as a raw material was converted to a structural unit of the polymer.

To the solution, 100 ml of petroleum ether was slowly added dropwise with stirring to obtain white precipitate. The precipitate was filtered and dried to obtain PLA. The following physical properties were measured on PLA.

The melting point of the PLA measured with a differential scanning calorimeter (DSC) was 72° C. The melting point obtained was clearly different from the melting point of conventional PLA (from 175° to 185° C.), melting point of raw material lactide (97° C.) and melting point of methylglucoside (178° C.). Endothermic amount was also smaller than conventional PLA and indicated low crystallinity.

H-NMR spectrum is illustrated in FIG. 1. A doublet assigned to methyl hydrogen of conventional PLA and a quartet assigned to methylene hydrogen of conventional PLA were clearly observed at 1.55 ppm and 5.16 ppm, respectively. In addition, a peak resulted from methylglucoside which had been converted to the structural unit of the polymer was found in the range of 3.3 to 4.8 ppm.

Figure 3:
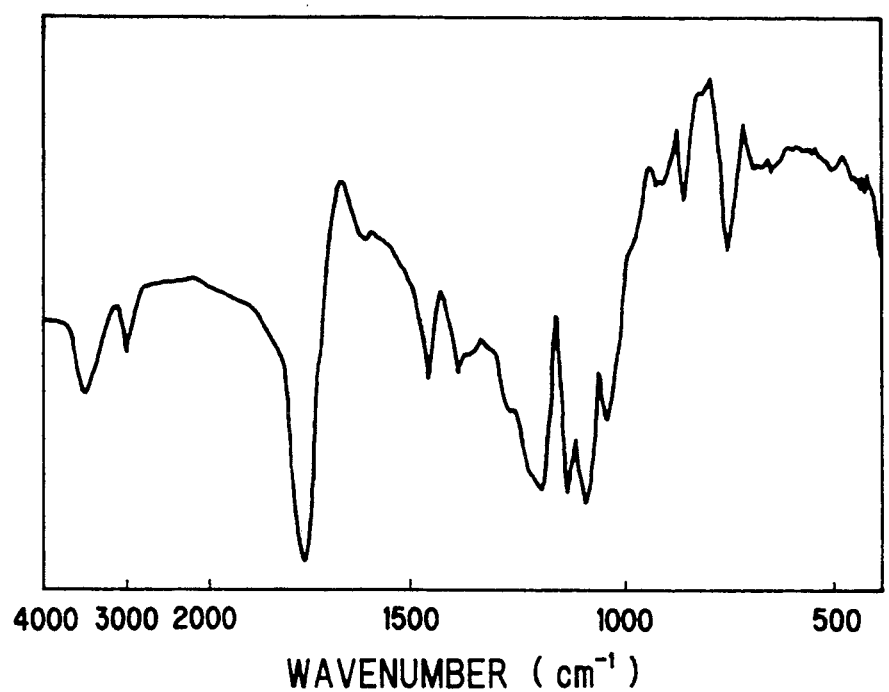
FIG. 3 illustrates an IR spectrum of the biocompatible polyester obtained in Example 1.

IR spectrum is illustrated in FIG. 3.

Absorption bands which had not been found on the IR spectrum of conventional polylactic acid were observed in the ranges of from 950 to 1000 cm$^{-1}$ and from 1500 to 1600 cm$^{-1}$.

Results of elemental analyses are as follows and in good agreement with calculated values.

|  | C | H | O |
| --- | --- | --- | --- |
| Found (%) | 48.28 | 5.99 | 45.73 |
| Calculated (%) | 48.59 | 5.89 | 45.51 |

After conducting hydrolysis test for 2 weeks, molecular weight retention was almost zero. The sample was decomposed to the monomer or oligomer like substances having very low molecular weight. The result illustrated good hydrolyzability.

As to the solubility in organic solvents, the sample was soluble in methanol, which property was different from that of conventional PLA.

EXAMPLE 2

Polymerization and post treatment were carried out by the same procedures as described in Example 1 except that methyl glucoside was used in an amount illustrated in Table 1 to obtain white PLA.

The polymer was completely dissolved in methylene chloride as in Example 1 and also soluble in methanol. Other physical properties are also illustrated in Table 1.

EXAMPLES 3-7 and COMPARATIVE EXAMPLES 1-2

To a glass polymerization tube, 5.0 g (0.035 mole) of L-lactide was charged and 0.03 wt % of a stannous octoate catalyst in the form of a toluene solution and various kinds of additives (saccharide or alcohol) in an amount illustrated in Table 1 were added. The amount of saccharide and alcohol was unified the hydroxyl group concentration of 0.053 mol % except Comparative Example 2.

The polymerization tube was dried for several hours under deaeration and sealed. Polymerization was carried out at 180° C. for 4 hours. After the reaction, 30 ml of methylene chloride was added to the reaction product and stirred. The product was completely dissolved in any case. The methylene chloride solution was poured into 500 ml of methanol to obtain white precipitate. The precipitate was filtered and dried to obtain PLA. PLA of Example 7 was partially soluble in methanol and hence reprecipitated from petroleum ether.

The results that PLA obtained in Examples 3-7 was completely dissolved in methylene chloride indicate that the saccharide used as a raw material was converted to a portion of the polymer structure.

Additionally, any PLA obtained in Examples 3-7 had better hydrolyzability than that Of PLA obtained in Comparative Example 1, and had lower retention of molecular weight after conducting hydrolysis for 2 weeks.

Figure 2:
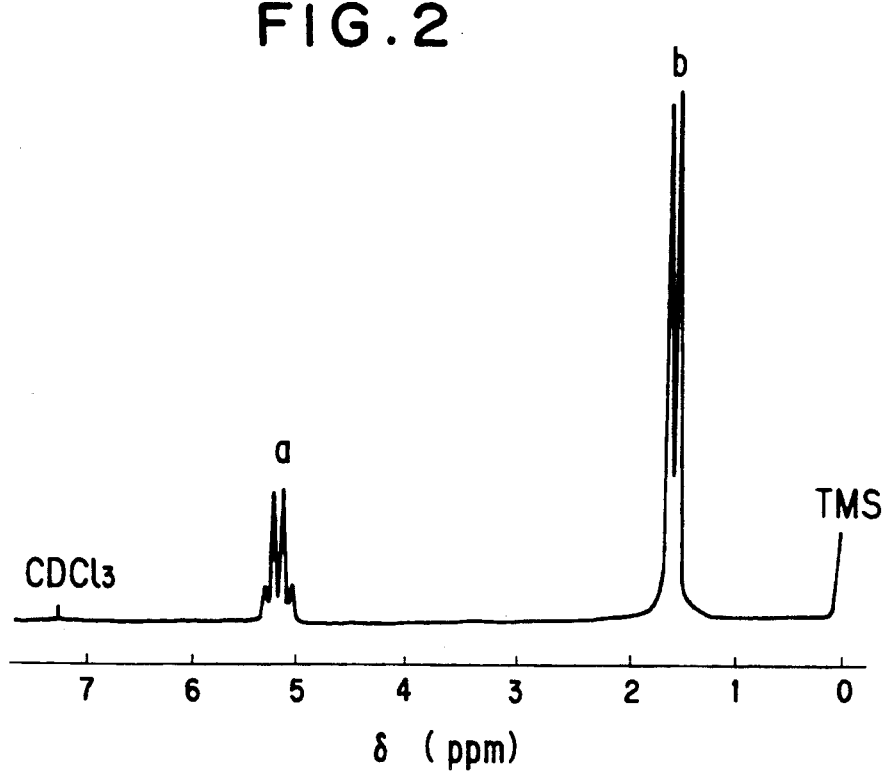
FIG. 2 illustrates a H-NMR spectrum of polylactic acid obtained in Comparative Example 1.
Figure 4:
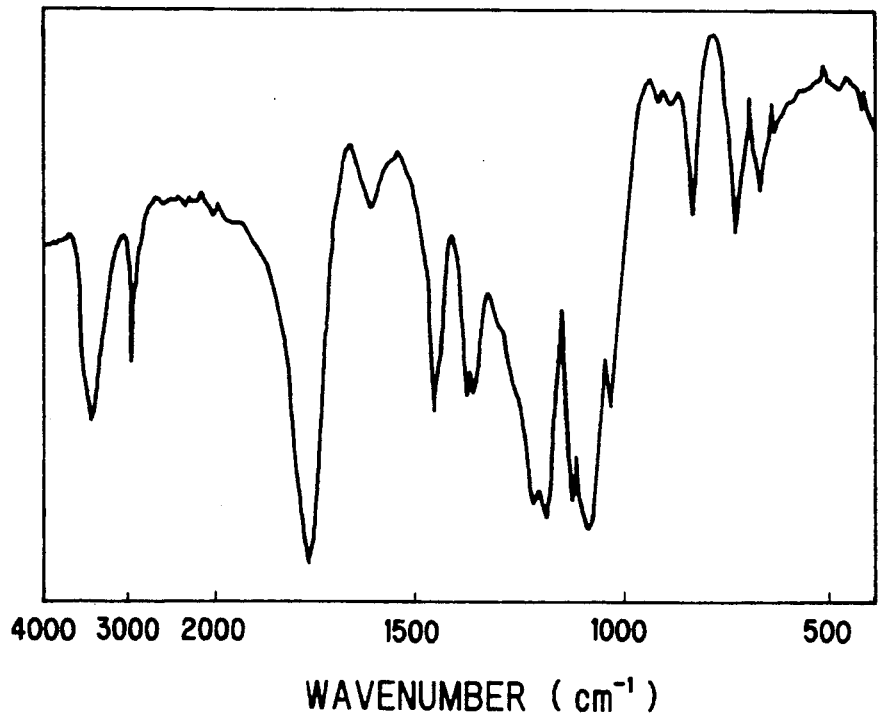
FIG. 4 illustrates an IR spectrum of polylactic acid obtained in Comparative Example 1.

The H-NMR spectrum of PLA obtained in Comparative Example 1 are shown in FIG. 2. A doublet (b) which is assigned to methyl hydrogen of the PLA and a quartet (a) which is assigned to methylene hydrogen of the PLA arc simply and definitely observed at 1.55 ppm and 5.16 ppm, respectively. The IR spectrum of PLA obtained in Comparative Example 1 is shown in FIG. 4.

Any of these spectra are clearly different from the above spectra obtained in Example 1 and indicate difference in molecular structure.

The polymer obtained in Example 7 has two melting peaks which are clearly divided at about 163° C. and about 174° C.

Other physical properties are also illustrated in Table 1.

EXAMPLES 8-9 and COMPARATIVE EXAMPLES 3-4

White PLA was obtained by carrying out the same procedures as described in Example 3 except that reaction conditions illustrated in Table 1 were used for the kind and amount of additive (saccharide or lauryl alcohol), polymerization temperature and polymerization time.

Physical properties of each PLA are illustrated in Table 1.

EXAMPLES 10-11 and COMPARATIVE EXAMPLES 5-7

To a glass polymerization tube, 5 g (0.043 mole) of glycolide was charged, and 100 ul of a 15 mg/10 ml toluene solution of stannous octoate catalyst and various additives (saccharide or alcohol) illustrated in Table 2 were added. The polymerization tube was dried for several hours under deaeration and sealed. Polymerization was carried out in an oil bath at 180° C. for 4 hours.

After finishing polymerization, a 10/7 mixture of phenol/trichlorophenol was added to the reaction mixture, and heated to 150° C. to dissolve the reaction mixture. The solution thus obtained was poured into methanol and precipitated polymer was filtered and dried Physical properties of the products and results on the hydrolyzability test are summarized in Table 2. Solution viscosity in the table was measured using a 7/10 mixture of trichlorophenol/phenol.

PGA obtained in Examples 10 and 11 exhibit faster hydrolyzability as compared with PGA obtained in Comparative Example 5. Further, PGA of the present invention has lower melt viscosity in spite of higher molecular weight and hence can be processed at lower temperatures.

TABLE 1

| | Monomer | Additive | Additive (wt %) | OH-concentration (mol %) | Sn-octoate (mol %) | Polymerization Temperature (°C.) | Polymerization Time (hr) | Polymer Yield (%) | Mw[1] | Melting point (°C.)[2] | Solubility in methanol | Molecular weight retention (%) after hydrolysis for 2 weeks |
|---|---|---|---|---|---|---|---|---|---|---|---|---|
| Example 1 | lactide | methyl-glucoside | 20.000 | 58.920 | 0.015 | 150 | 2 | 79.2 | 1900 | 79 | soluble | —[3] |
| Example 2 | lactide | methyl-glucoside | 5.000 | 14.730 | 0.015 | 150 | 2 | 91.7 | 16000 | 111 | soluble | —[3] |
| Example 3 | lactide | methyl-glucoside | 0.018 | 0.053 | 0.003 | 180 | 4 | 66.3 | 250000 | 181 | insoluble | 88 |
| Example 4 | lactide | starch | 0.020 | 0.053 | 0.003 | 180 | 4 | 16.5 | 30000 | 173 | insoluble | 20 |
| Example 5 | lactide | dextrin | 0.020 | 0.053 | 0.003 | 180 | 4 | 33.7 | 110000 | 177 | insoluble | 83 |
| Example 6 | lactide | dextran | 0.020 | 0.053 | 0.003 | 180 | 4 | 28.4 | 54000 | 176 | insoluble | 65 |
| Example 7 | lactide | amylose | 0.020 | 0.053 | 0.003 | 180 | 4 | 18.1 | 14000 | 163, 174 | partly soluble | —[3] |
| Comp. Ex. 1 | lactide | lauryl alcohol | 0.069 | 0.053 | 0.003 | 180 | 4 | 64.0 | 96000 | 179 | insoluble | 95 |
| Comp. Ex. 2 | lactide | — | 0 | 0 | 0.003 | 180 | 4 | 44.5 | 152000 | 179 | insoluble | 97 |
| Example 8 | lactide | sucrose | 0.050 | 0.168 | 0.003 | 140 | 45 | 52.4 | 80000 | 175 | insoluble | 79 |
| Example 9 | lactide | glucose | 0.042 | 0.168 | 0.003 | 140 | 45 | 59.3 | 76000 | 175 | insoluble | 66 |
| Comp. Ex. 3 | lactide | lauryl alcohol | 0.218 | 0.168 | 0.003 | 140 | 45 | 73.0 | 68000 | 178 | insoluble | 93 |
| Comp. Ex. 4 | lactide | lauryl alcohol | 1.000 | 0.771 | 0.003 | 140 | 45 | 95.4 | 17000 | 174 | insoluble | 83 |

Note:
[1] converted to polystyrene
[2] melting point of lactide monomer: 97° C.
[3] impossible to measure due to low molecular weight.

TABLE 2

| | Monomer | Additive | Additive (wt %) | Sn-octoate (mol %) | Polymerization Temperature (°C.) | Polymerization Time (hr) | Yield (%) | Solution viscosity | Mn[1] | Mw/Mn | Melt viscosity (poise) | Molecular weight retention (%) after hydrolysis for 5 weeks |
|---|---|---|---|---|---|---|---|---|---|---|---|---|
| Example 10 | glycolide | sucrose | 0.062[2] | 0.003 | 180 | 4 | 77.3 | 1.47 | 38000 | 3.9 | 1060 | 54 |
| Example 11 | glycolide | methyl glucoside | 0.070[2] | 0.003 | 180 | 4 | 81.2 | 1.46 | 42000 | 3.7 | 970 | 71 |
| Comp. Ex. 5 | glycolide | LaOH | 0.270[2] | 0.003 | 180 | 4 | 72.7 | 1.16 | 37000 | 3.3 | 2600 | 91 |
| Comp. Ex. 6 | glycolide | LaOH | 2.780 | 0.003 | 180 | 4 | 89.6 | 0.37 | 25000 | 2.2 | 544 | 49 |
| Comp. Ex. 7 | glycolide | — | 0 | 0.003 | 180 | 4 | 50.1 | 0.81 | 25000 | 5.3 | 990 | 77 |

Note)
LaOH: lauryl alcohol
[1] converted to polystyrene
[2] OH-concentration is unified to 0.168 mol %.

EXAMPLE 12

To a glass polymerization tube, 2.32 g (0.02 mole) of glycolide and 2.88 g (0.02 mole) of DL-lactide (a racemic mixture of D-lactide and L-lactide) were charged, and 0.01 wt % of stannous octoate and 0.5 mol % of methylglucoside were added. The tube was deaerated and sealed as described in Example 1. Polymerization was conducted at a 180° C. for 6 hours in an oil bath.

The resultant polymer was purified by the same procedures as described in Example 3.

The polymer thus obtained had a solution viscosity of 0.92 in chloroform and a molecular weight retention of 39% after a hydrolysis test for 2 weeks.

COMPARATIVE EXAMPLE 8

Copolymerization of glycolide and DL-lactide was carried out by conducting the same procedures as described in Example 12 except that 0.5 mol % of lauryl alcohol was added in place of methylglycoside.

The polymer obtained had a solution viscosity of 0.49 in chloroform and a molecular weight retention of 81% after a hydrolysis test for 2 weeks.

EXAMPLE 13

To a glass polymerization tube, 4.06 g (0.035 mole) of glycolide and 5.04 g (0.035 mole) of L-lactide were charged, and 0.015 wt % of stannous octoate and 10 mg (0.01 wt %) of methylglucoside were added. The tube was deaerated and sealed by the same procedures as described in Example 1 and polymerization was conducted at 120° C. in an oil bath. The viscosity of reaction mixture was considerably increased after about 20 minutes.

After conducting polymerization for 20 hours, the reaction mixture was dissolved in HFIP and then poured into methanol to obtain polymer as white solid.

The polymer had a solution viscosity of 1.71 in HFIP, and molecular weight retention of 51% after a hydrolysis test for 2 weeks.

COMPARATIVE EXAMPLE 9

The same polymerization procedures as described in Example 13 were carried out except that addition of methylglucoside to the polymerization system was omitted.

It took 5 to 6 hours to increase the viscosity of the reaction mixture to about the same level as the viscosity at 20 minutes after starting polymerization in Example 13.

After conducting polymerization for 20 hours, the reaction mixture was dissolved in HFIP and then poured into methanol to obtain the polymer as white solid.

The polymer had a solution viscosity of 2.74 in HFIP and molecular weight retention of 88% after a hydrolysis test for 2 weeks.

The present invention provides a novel biocompatible polyester and preparation process thereof.

The biocompatible polyester of the invention contains a saccharide skeleton in the structure of the polymer molecule, and hence has specific characteristics as compared with conventional biocompatible polyesters. In particular, the polyester of the invention has remarkably improved hydrolyzability and the hydrolyzability is enhanced without accompanying decrease in the molecular weight.

That is, the present invention can provide biocompatible polyester having improved hydrolyzability or desired level of hydrolyzability corresponding to the object for use by varying the kind and amount of saccharide used. Thus, the value of the polyester in the medical field has greatly increased.

We claim:

1. A bicompatible polyester comprising a saccharide selected from the group consisting of polysaccharide and glucoside bonded to the structure of a polymer molecule having recurring structural units consisting essentially of a glycolic acid unit, a lactic acid unit or a glycolic acid unit and a lactic acid unit, said recurring structural units being represented by the formula (I):

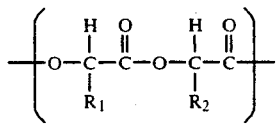

wherein each of $R_1$ and $R_2$ is a hydrogen atom or a methyl group and may be the same or different wherein the polyester has a weight average molecular weight converted to polystyrene of from 1900 to 250000.

2. The biocompatible polyester of claim 1 wherein the saccharide is a glucoside.

3. The biocompatible polyester of claim 1 wherein the saccharide is methylglucoside.

4. A biocompatible polyester obtained by a process comprising polymerizing glycolide, lactide or glycolide and lactide in the presence of a saccharide selected from the group consisting of polysaccharide and glucoside and bonding said saccharide to the structure of a polymer molecule having recurring structural units essentially consisting of a glycolic acid unit, a lactic acid unit or a glycolic acid unit and a latic acid unit, said recurring structural units being represented by the formula (I):

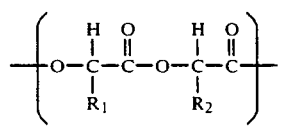

wherein each of $R_1$ and $R_2$ is a hydrogen atom or a methyl group and may be the same or different wherein the polyester has a weight average molecular weight converted to polystyrene of from 1900 to 250000.

5. The biocompatible polyester of claim 4 wherein the saccharide is a glucoside.

6. The biocompatible polyester of claim 4 wherein the saccharide is methylglucoside.

7. The biocompatible polyester of claim 4 wherein the hydroxyl group concentration of the saccharide in the polymerization is from 0.001 to 1% by mole per mole of glycolide, lactide or glycolide and lactide.

8. The biocompatible polyester of claim 4 wherein the hydroxyl group concentration of the saccharide in the polymerization is from 0.01 to 0.1% by mole per mole of glycolide, lactide or glycolide and lactide.

9. A process for preparing a bicompatible polyester comprising a saccharide selected from the group consisting of polysaccharide and glucoside bonded to the structure of a polymer molecule having recurring structural units consisting essentially of a glycolic acid unit, a lactic acid unit or a glycolic acid unit and a lactic acid unit, said recurring structural units being represented by the formula (I):

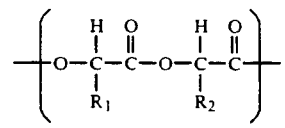

wherein each of $R_1$ and $R_2$ is a hydrogen atom or a methyl group and may be the same or different wherein the polyester has a weight average molecular weight converted to polystyrene of from 1900 to 250000, comprising polymerizing glycolide, lactide or glycolide and lactide in the presence of the saccharide.

10. The process of claim 9 wherein the saccharide is methylglucoside.

11. The process of claim 9 wherein the hydroxyl group concentration of the saccharide in the polymerization is from 0.001 to 1% by mole per mole of glycolide and/or lactide.

12. The process of claim 9 wherein the hydroxyl group concentration of the saccharide in the polymerization is from 0.01 to 0.1% by mole per mole of glycolide, lactide or glycolide and lactide.

* * * * *

UNITED STATES PATENT AND TRADEMARK OFFICE
CERTIFICATE OF CORRECTION

PATENT NO. : 5,247,013
DATED      : September 21, 1993
INVENTOR(S): SHINODA et al It is certified that error appears in the above-identified patent and that said Letters Patent is hereby corrected as shown below:

In column 13, claim 1, line 64, amend "bicompatible" to --biocompatible--.

In column 14, claim 9, line 53, amend "bicompatible" to --biocompatible--.

Signed and Sealed this

Twenty-sixth Day of April, 1994

Attest:

BRUCE LEHMAN

Attesting Officer            Commissioner of Patents and Trademarks